(12) United States Patent
Cheng et al.

(10) Patent No.: US 12,006,967 B2
(45) Date of Patent: Jun. 11, 2024

(54) WELDING STRUCTURE FOR CONNECTION OF TWO OBJECTS

(71) Applicant: CHICONY POWER TECHNOLOGY CO., LTD., New Taipei (TW)

(72) Inventors: Chao-Cheng Cheng, New Taipei (TW); Jen-Lung Ma, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 526 days.

(21) Appl. No.: 17/219,012

(22) Filed: Mar. 31, 2021

(65) Prior Publication Data

US 2022/0203629 A1 Jun. 30, 2022

(30) Foreign Application Priority Data

Dec. 31, 2020 (TW) .................................. 109147127

(51) Int. Cl.
*F16B 5/08* (2006.01)
*H01R 13/504* (2006.01)

(52) U.S. Cl.
CPC .............. *F16B 5/08* (2013.01); *H01R 13/504* (2013.01); *Y10T 403/477* (2015.01)

(58) Field of Classification Search
CPC ........ F16B 5/08; F16B 11/002; F16B 11/004; Y10T 403/477; B29C 66/11; B29C 66/124; B29C 66/1242; B29C 66/12421; B29C 66/12423; B29C 66/12425; B29C 66/128; B29C 66/1286; B29C 66/12861; B29C 66/12862; B29C 66/12; H01R 13/504

See application file for complete search history.

(56) References Cited

U.S. PATENT DOCUMENTS 4,648,722 A * 3/1987 Mock ................ B29C 66/12842
968/374
4,919,987 A * 4/1990 Manner ............... B29C 65/0672
428/474.7

(Continued)

FOREIGN PATENT DOCUMENTS

CN 2472320 Y 1/2002
CN 101337430 A 1/2009

(Continued)

*Primary Examiner* — Amber R Anderson
*Assistant Examiner* — Kevin J Baynes
(74) *Attorney, Agent, or Firm* — Muncy, Geissler, Olds & Lowe, P.C.

(57) ABSTRACT

A welding structure includes a first object and a second object connected to each other. The first object includes a first surface, a second surface, a first bonding surface, a welding portion and a second bonding surface. The first bonding surface is connected to one side of the second surface away from the first surface. The welding portion is disposed on a surface perpendicular and connected to the first bonding surface. One side of the second bonding surface is connected to the welding portion. The second object includes a third surface, a fourth surface, a third bonding surface and a fourth bonding surface. The third bonding surface is corresponding to the first bonding surface and connected to one side of the fourth surface away from the third surface. The fourth bonding surface is corresponding to the welding portion and the second bonding surface.

6 Claims, 8 Drawing Sheets

(56) References Cited

U.S. PATENT DOCUMENTS

| | | | | |
|---|---|---|---|---|
| 5,263,606 A | * | 11/1993 | Dutt | B29C 66/24223 53/DIG. 2 |
| 5,465,856 A | * | 11/1995 | Sheffler | B29C 66/12842 220/613 |
| 5,782,370 A | * | 7/1998 | Kamiya | H05K 9/0067 220/784 |
| 6,220,777 B1 | * | 4/2001 | Clarke | B29C 65/08 403/336 |
| 6,706,357 B2 | * | 3/2004 | Sugimura | B29C 65/0636 428/58 |
| 6,927,335 B2 | * | 8/2005 | Lim | H02G 3/088 439/535 |
| 7,037,393 B2 | * | 5/2006 | Drummond | B29C 65/72 156/69 |
| 7,407,338 B2 | * | 8/2008 | Baylis | B29C 65/7841 264/405 |
| 7,887,668 B2 | * | 2/2011 | Wang | B29C 65/58 156/325 |
| 9,882,302 B2 | | 1/2018 | Kwan et al. | |
| 10,375,846 B2 | * | 8/2019 | I | B29C 66/12469 |
| 10,622,752 B2 | * | 4/2020 | Dvorak | B29C 65/02 |
| 2006/0053623 A1 | | 3/2006 | I | |
| 2008/0278045 A1 | * | 11/2008 | Fan | H05K 5/063 312/223.6 |
| 2013/0189024 A1 | * | 7/2013 | Kobayashi | B29C 66/12841 403/270 |
| 2013/0336710 A1 | * | 12/2013 | Chou | B29C 66/73921 403/270 |
| 2015/0014006 A1 | * | 1/2015 | Hozumi | H01H 9/04 173/46 |
| 2018/0206349 A1 | | 7/2018 | I et al. | |
| 2019/0372265 A1 | | 12/2019 | Heyman et al. | |

FOREIGN PATENT DOCUMENTS

| | | | |
|---|---|---|---|
| CN | 201985181 U | 9/2011 | |
| CN | 102316689 A | 1/2012 | |
| CN | 103358015 A | 10/2013 | |
| CN | 102316689 B | 8/2014 | |
| CN | 204291291 U | 4/2015 | |
| CN | 208290505 A | 12/2018 | |
| CN | 0210415544 U | 4/2020 | |
| CN | 210648996 U | 6/2020 | |
| CN | 211293974 U | 8/2020 | |
| CN | 111975189 A | 11/2020 | |
| CN | 112076376 A | 12/2020 | |
| FR | 2242189 A1 * | 3/1975 | F16B 5/08 |
| JP | 2540838 B2 | 10/1996 | |
| KR | 20160016348 A | 2/2016 | |
| TW | I264263 B | 10/2006 | |
| TW | M-539770 U | 4/2017 | |
| TW | I595822 B | 8/2017 | |
| TW | I633826 B | 8/2018 | |
| WO | WO-2011158330 | 12/2011 | |

* cited by examiner

US 12,006,967 B2

WELDING STRUCTURE FOR CONNECTION OF TWO OBJECTS

CROSS REFERENCE TO RELATED APPLICATIONS

This Non-provisional application claims priority under 35 U.S.C. § 119(a) on Patent Application No(s). 109147127 filed in Taiwan, Republic of China on Dec. 31, 2020, the entire contents of which are hereby incorporated by reference.

BACKGROUND

Technology Field

The present disclosure relates to a welding structure and, in particular, to a welding structure capable of avoiding overflow and enhancing welding strength.

Description of Related Art

In the conventional product, a combination structure is usually needed to firmly combine various components of the conventional product. Taking the housing of an electronic product as an example, the upper and lower housings can be connected and fixed to each other through an engaging structure, a locking structure, a welding structure, or the like. Because the ultrasonic welding can quickly assemble the housings of the electronic device, the welding structure is a more commonly used method.

Referring to FIG. 4A and FIG. 4B, wherein FIG. 4A is a schematic diagram showing the corresponding positions of structures of the conventional welding structure, and FIG. 4B is a schematic diagram showing the welding structure of FIG. 4A after the welding process. Here, an upper housing 31 and a lower housing 32 of the electronic device 3 are taken as an example for an illustration. The conventional welding element 33 will be filled in the gap between the upper housing 31 and the lower housing 32 (the gray part as shown in FIG. 4B) after the ultrasonic welding process is performed, thereby fixing the upper housing 31 and the lower housing 32. However, the design of this welding structure 33 is prone to cause the gel overflow (as shown in FIG. 4B, the gel overflows from the gap between the upper housing 31 and the lower housing 32 to the outer surface of the electronic device 3). The gel overflow can affect the appearance of the assembled housing, and the extra effort and manpower are needed to remove the overflowed gel.

Therefore, it is desired to provide a welding structure that can prevent the gel overflow, thereby keeping the clean appearance of the product and saving the cost for the effort and manpower on checking the overflowed gel.

SUMMARY

This disclosure is to provide a welding structure for connection of two objects. Compared with the conventional art, the welding structure of this disclosure can prevent the gel overflow, thereby saving the cost for the effort and manpower on checking removing the overflowed gel, improving the production efficiency, and keeping the clean appearance of the product.

In addition, this disclosure is to provide the microstructures for enhancing the connection strength of the connected welding structure, thereby firmly fixing the connected two objects.

To achieve the above, a welding structure for connection comprises a first object and a second object. The first object comprises a first surface, a second surface, a first bonding surface, a welding portion, and a second bonding surface. The first surface is located at an outer periphery of the first object and perpendicular to an outer surface of the first object. One side of the second surface is connected to one side of the first surface away from the outer surface of the first object. The first bonding surface is located adjacent to the outer periphery of the first object and connected to one side of the second surface away from the first surface. The welding portion is disposed on a surface of the first object perpendicular and connected to the first bonding surface. The welding portion has a shape of triangular prism. One side of the second bonding surface is connected to the welding portion, and the second bonding surface has a width. The second object is correspondingly connected to the first object. The second object comprises a third surface, a fourth surface, a third bonding surface and a fourth bonding surface. The third surface is corresponding to the first surface. The third surface is located at an outer periphery of the second object and is perpendicular to an outer surface of the second object. One side of the fourth surface is connected to one side of the third surface away from the outer surface of the second object. The third bonding surface is corresponding to the first bonding surface, and the third bonding surface is located adjacent to the outer periphery of the second object and connected to one side of the fourth surface away from the third surface. The fourth bonding surface is corresponding to the welding portion and the second bonding surface, and one side of the fourth bonding surface is connected to one side of the third bonding surface. A width of the fourth bonding surface is equal to a sum of a bottom length of the welding portion and the width of the second bonding surface.

In one embodiment, the second object further comprises a detention groove disposed on the fourth surface.

In one embodiment, the detention groove is a U-shape groove or a V-shape groove.

In one embodiment, when performing an ultrasonic welding process, the welding portion is melted to form a gel for bonding the second bonding surface to the fourth bonding surface.

In one embodiment, the first bonding surface has a first anti-overflow structure, and the third bonding surface has a second anti-overflow structure.

In one embodiment, the first anti-overflow structure and the second anti-overflow structure are non-planar microstructures.

In one embodiment, the first anti-overflow structure and the second anti-overflow structure are in saw-tooth arrangement.

To achieve the above, a welding structure for connection comprises a first object and a second object. The first object comprises a first bonding surface, a welding portion, and a second bonding surface. The first bonding surface is located at an outer periphery of the first object and perpendicular to an outer surface of the first object. The first bonding surface has a first anti-overflow structure. The welding portion is disposed on a surface of the first object perpendicular and connected to the first bonding surface. The welding portion has a shape of triangular prism. One side of the second bonding surface is connected to the welding portion, and the second bonding surface has a width. The second object correspondingly connected to the first object and comprises a third bonding surface and a fourth bonding surface. The third bonding surface is located at an outer periphery of the second object and perpendicular to an outer surface of the second object. The third bonding surface is corresponding to the first bonding surface, and the third bonding surface has a second anti-overflow structure. The fourth bonding surface is corresponding to the welding portion and the second bonding surface. One side of the fourth bonding surface is connected to one side of the third bonding surface, and a width of the fourth bonding surface is equal to a sum of a bottom length of the welding portion and the width of the second bonding surface.

In one embodiment, when performing an ultrasonic welding process, the welding portion is melted to form a gel for bonding the second bonding surface to the fourth bonding surface.

In one embodiment, the first anti-overflow structure and the second anti-overflow structure are non-planar microstructures.

In one embodiment, the first anti-overflow structure and the second anti-overflow structure are in saw-tooth arrangement.

As mentioned above, the welding structure of this disclosure can prevent the gel overflow, thereby saving the cost for the effort and manpower on checking and removing the overflowed gel, improving the production efficiency, and keeping the clean appearance of the product. In addition, the configuration of the microstructures can enhance the connection strength of the connected welding structure, thereby firmly fixing the connected two objects.

BRIEF DESCRIPTION OF THE DRAWINGS

The disclosure will become more fully understood from the detailed description and accompanying drawings, which are given for illustration only, and thus are not limitative of the present disclosure, and wherein:

FIG. 2A is a partial enlarged sectional view of the first and second objects of FIG. 1A according to the first embodiment, wherein FIG. 2A shows the first and second objects as well as the welding structure before performing the welding process;

FIG. 2B is a partial enlarged sectional view of the first and second objects of FIG. 2A, wherein FIG. 2B shows the assembled first and second objects as well as the welding structure before performing the welding process;

FIG. 2C is a partial enlarged sectional view of the first and second objects of FIG. 2B, wherein FIG. 2C shows the assembled first and second objects as well as the welding structure after performing the welding process;

FIG. 3B is a partial enlarged sectional view of the first and second objects of FIG. 3A, wherein FIG. 3B shows the assembled first and second objects as well as the welding structure before performing the welding process;

FIG. 3C is a partial enlarged sectional view of the first and second objects of FIG. 3B, wherein FIG. 3C shows the assembled first and second objects as well as the welding structure after performing the welding process;

DETAILED DESCRIPTION OF THE DISCLOSURE

The present disclosure will be apparent from the following detailed description, which proceeds with reference to the accompanying drawings, wherein the same references relate to the same elements.

The welding structure of this disclosure has the configuration of an anti-overflow structure for preventing the gel overflow, thereby saving the cost for the effort and manpower on checking and removing the overflowed gel, improving the production efficiency, and keeping the clean appearance of the product. In addition, the configuration of the anti-overflow structure can enhance the connection strength of the connected welding structure, thereby firmly fixing the connected two objects.

Figure 1A:
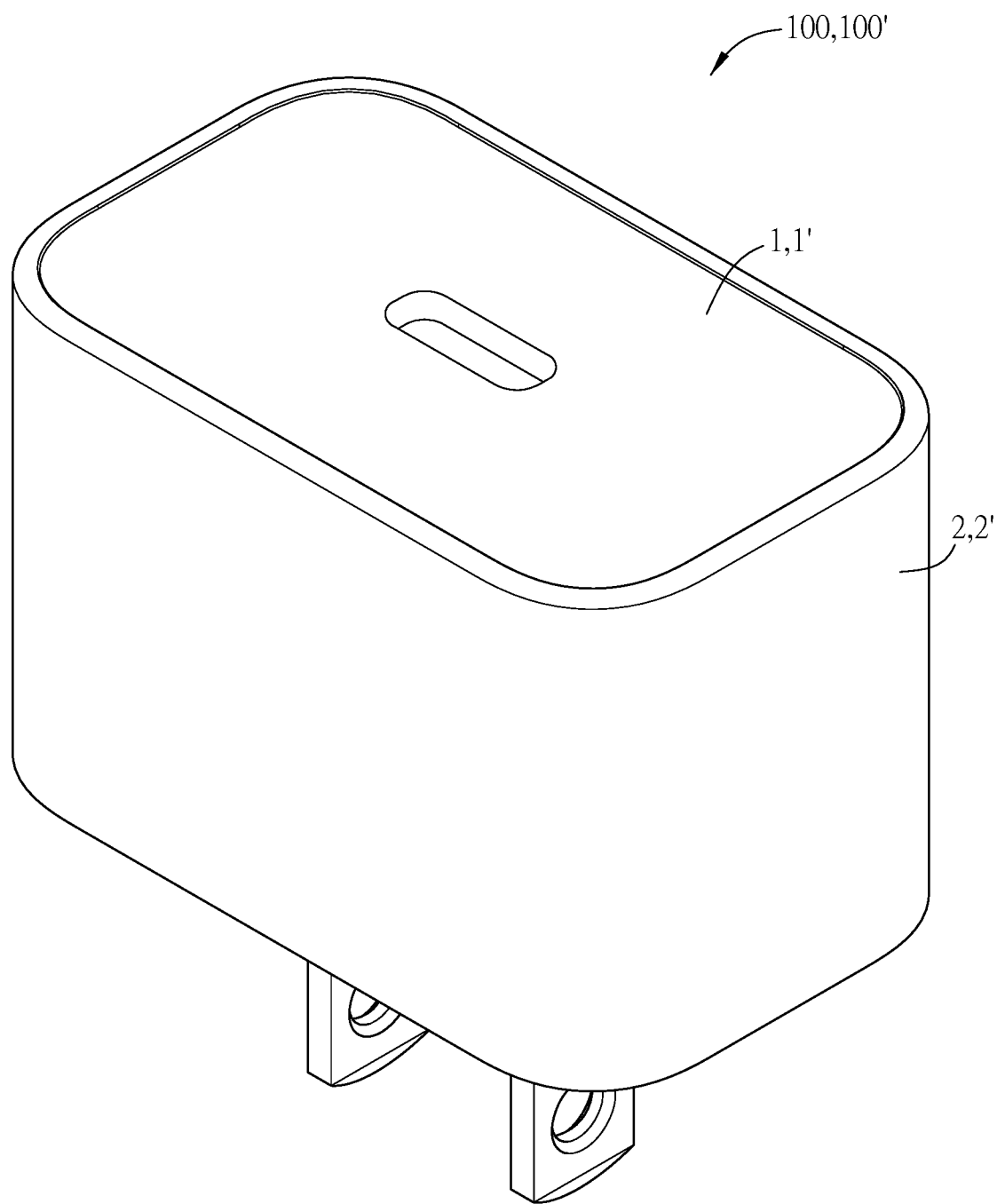
FIG. 1A is a schematic diagram showing the assembled first object and second object according to a first embodiment and a second embodiment of this disclosure.
Figure 1B:
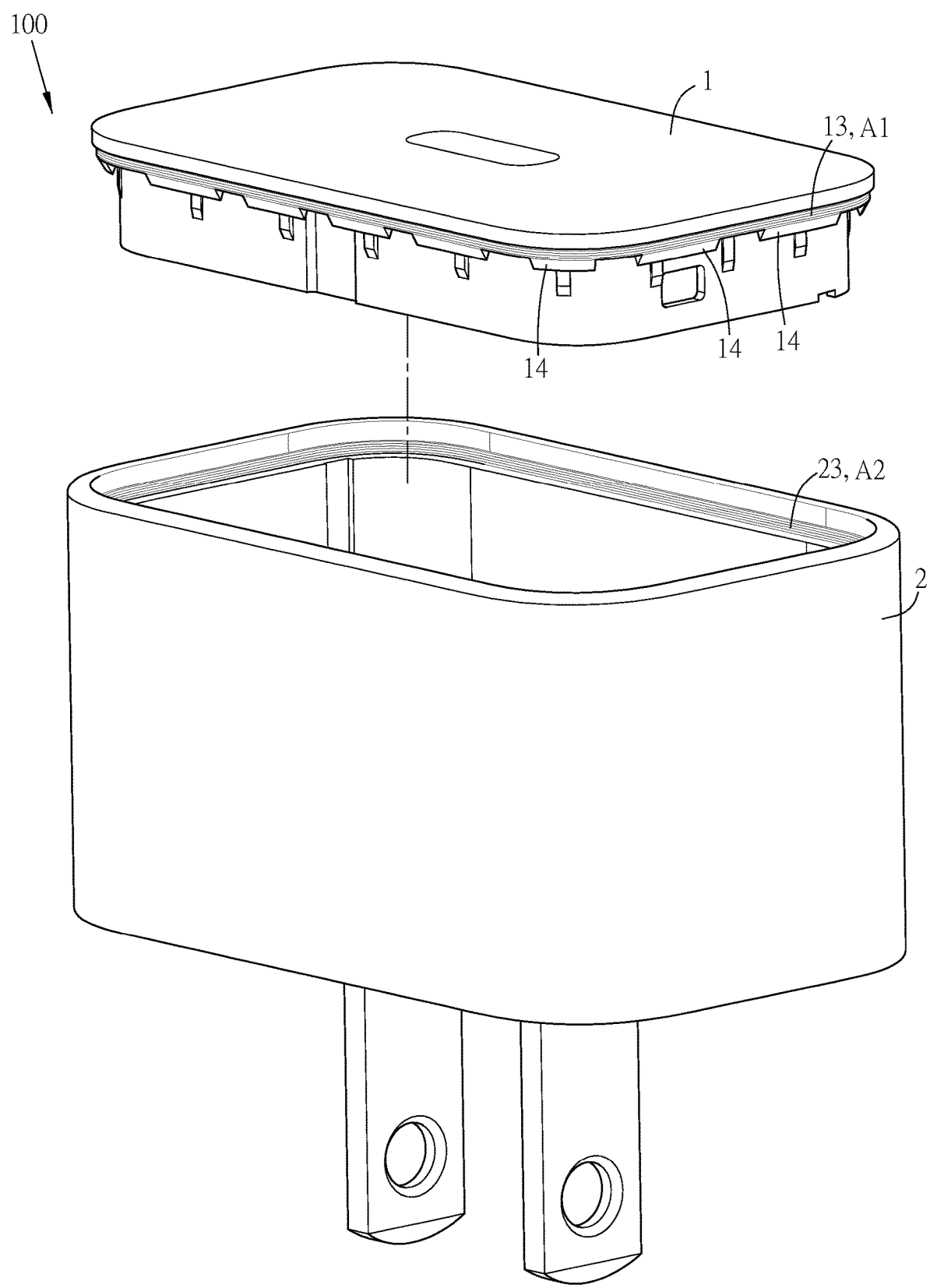
FIG. 1B is an exploded view of the first object and the second object of FIG. 1A according to the first embodiment.

Please refer to FIGS. 1A and 1B, wherein FIG. 1A is a schematic diagram showing the assembled first object and second object according to a first embodiment and a second embodiment of this disclosure, and FIG. 1B is an exploded view of the first object and the second object of FIG. 1A according to the first embodiment. As shown in FIGS. 1A and 1B, in this embodiment, a welding structure 100 for connection of two objects comprises a first object 1 and a second object 2. In this embodiment, the two objects are assembled to form an electronic connector for example. To be noted, the two objects can be assembled to form, for example but not limited to, a computer host, a display, an electronic connector, a power supply, or any of other electronic devices. The object can be, for example but not limited to, the housing, cover or any of the structures to be fixed correspondingly of the above-mentioned devices or products.

Figure 2A:
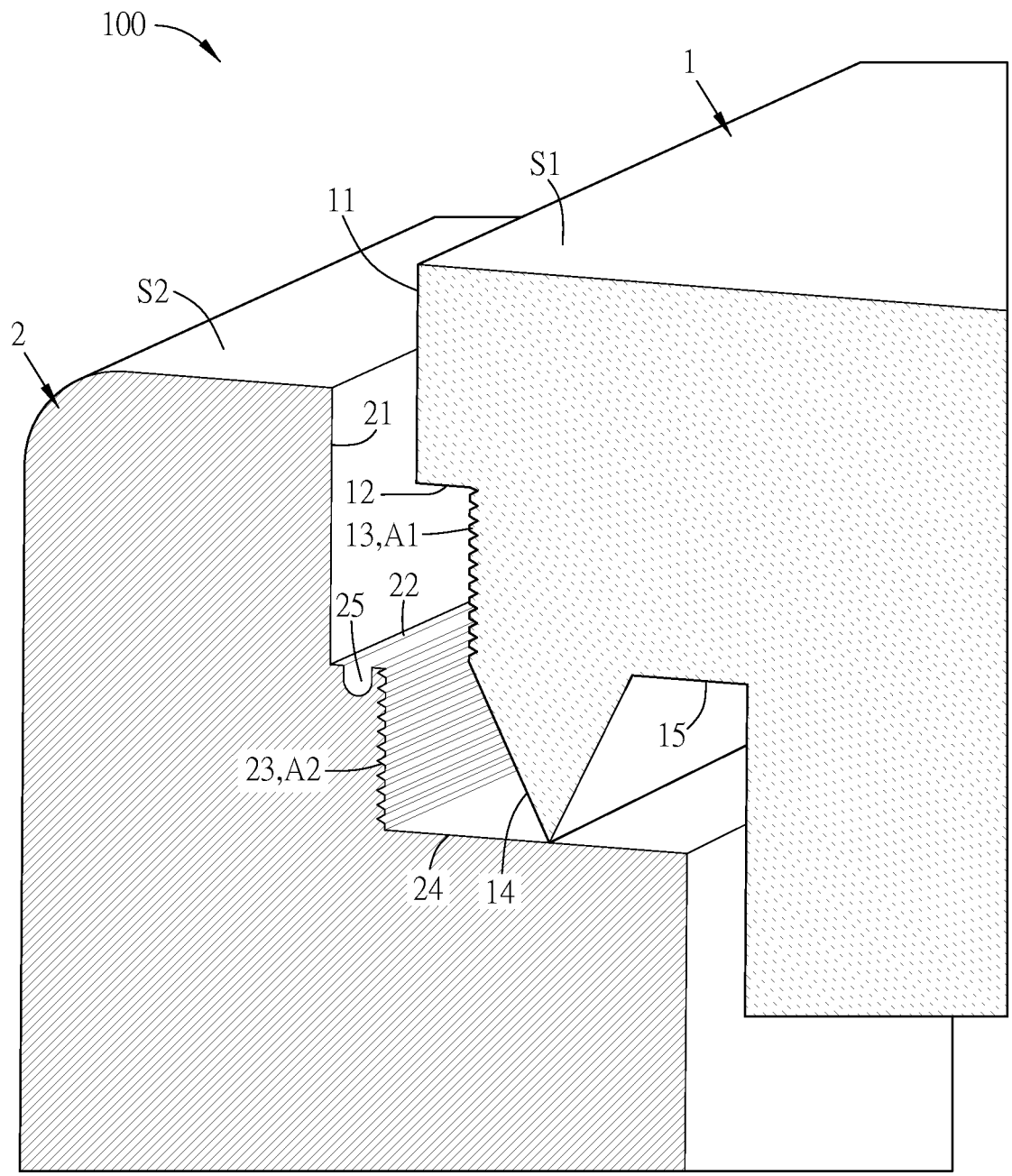
Figure 2B:
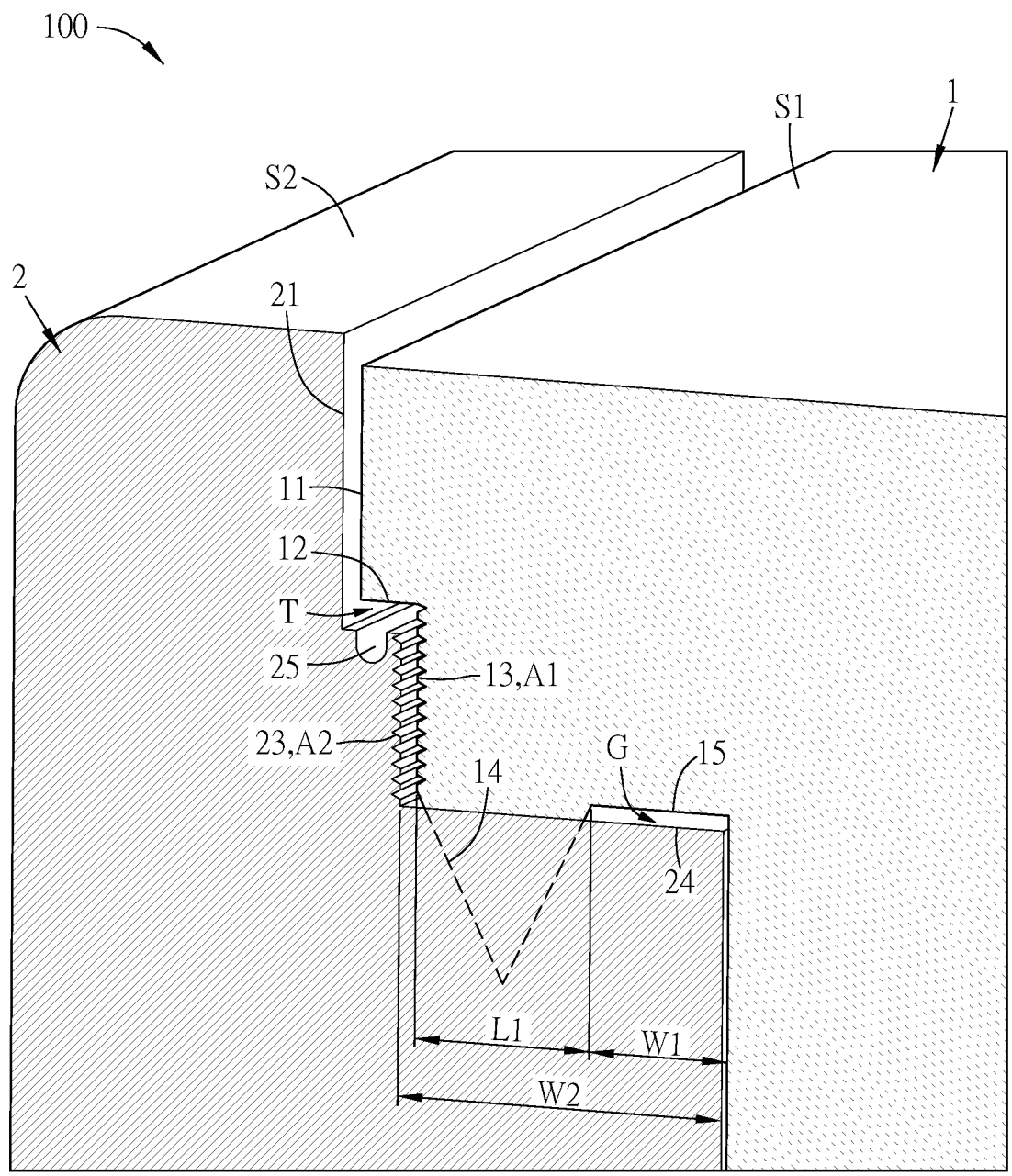
Figure 2C:
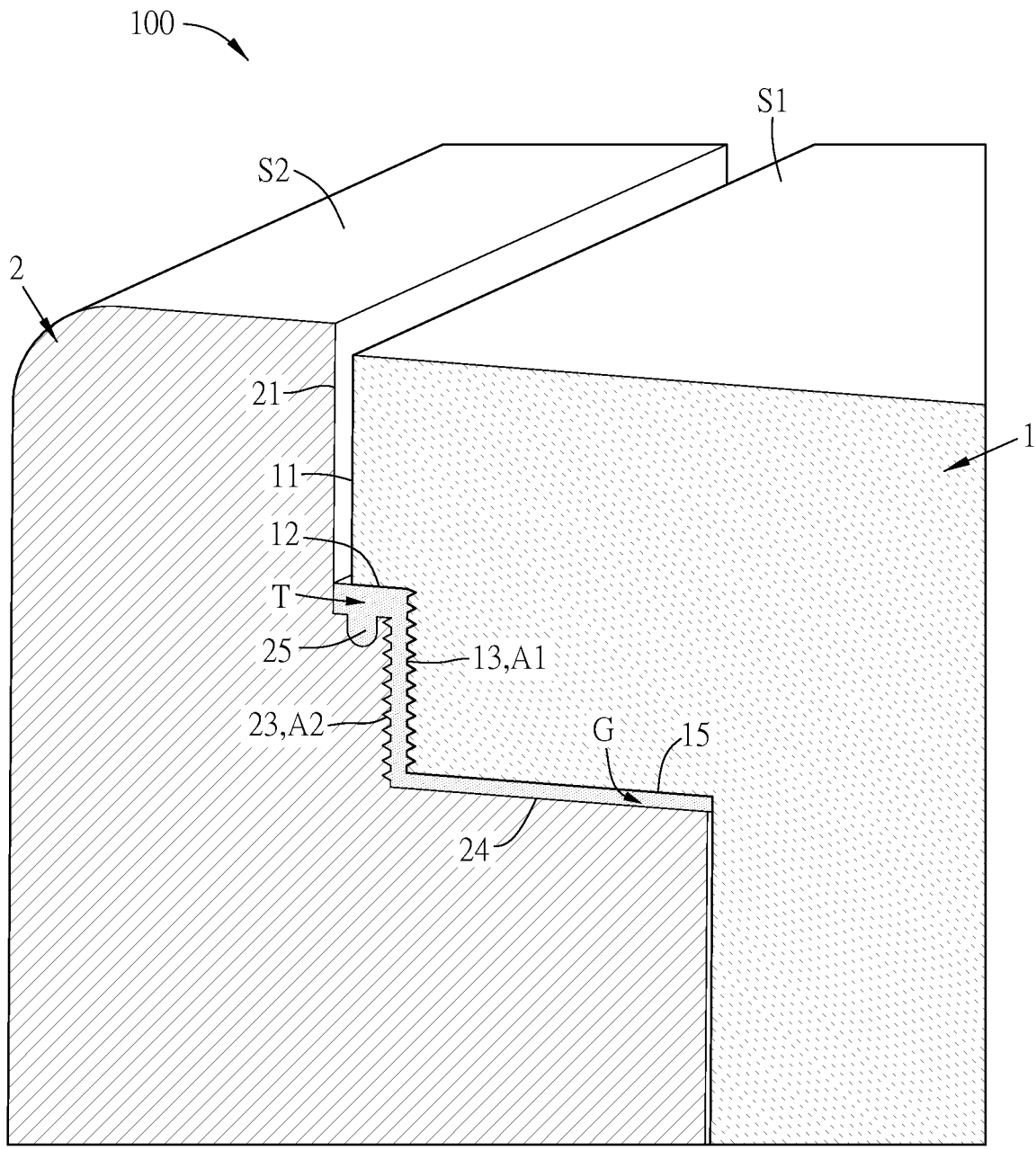

Please refer to FIGS. 1A and 1B in view of FIGS. 2A to 2C. FIG. 2A is a partial enlarged sectional view of the first and second objects of FIG. 1A according to the first embodiment, and FIG. 2A shows the first and second objects as well as the welding structure before performing the welding process. FIG. 2B is a partial enlarged sectional view of the first and second objects of FIG. 2A, and FIG. 2B shows the assembled first and second objects as well as the welding structure before performing the welding process. FIG. 2C is a partial enlarged sectional view of the first and second objects of FIG. 2B, and FIG. 2C shows the assembled first and second objects as well as the welding structure after performing the welding process. In this embodiment, the first object 1 comprises a first surface 11, a second surface 12, a first bonding surface 13, a welding portion 14, and a second bonding surface 15. The first surface 11 is located at an outer periphery of the first object 11 and perpendicular to an outer surface S1 of the first object 1. One side of the second surface 12 is connected to one side of the first surface 11 away from the outer surface S1 of the first object 1. The first bonding surface 13 is located adjacent to the outer periphery of the first object 1 and connected to one side of the second surface 12 away from the first surface 11. The welding portion 14 is disposed on a surface of the first object 1 perpendicular and connected to the first bonding surface 13. The welding portion 14 has a shape of triangular prism. One side of the second bonding surface 15 is connected to the welding portion 14, and the second bonding surface 15 has a width W1. To be noted, in this embodiment, the first surface 11 and the second surface 12 are perpendicular to each other, and the first bonding surface 13 and the second surface 12 are perpendicular to each other. In other embodiments, any two surfaces can be connected with an included angle of, for example but not limited to, 30, 45 or 60 degrees, and this disclosure is not limited. In addition, the welding structure 100 can be formed at a part of the junction of the first object 1 and the second object 2 instead of the entire junction thereof. For example, as shown in FIG. 1B, the welding portion 14 of the first object 1 of the welding structure 100 can comprise a plurality of sections, which are separately disposed on the surface perpendicular and connected to the first bonding surface 13. Alternatively, the welding portion 14 can be a single structure (not shown) continuously disposed on the entire surface perpendicular and connected to the first bonding surface 13. Any structure that can firmly fix the first object 1 to the second object 2 after the ultrasonic welding process is applicable, and this disclosure is not limited thereto.

In this embodiment, the second object 2 is correspondingly connected to the first object 1. The second object 2 comprises a third surface 21, a fourth surface 22, a third bonding surface 23, and a fourth bonding surface 24. The third surface 21 is corresponding to the first surface 11. The third surface 21 is located at an outer periphery of the second object 2 and is perpendicular to an outer surface S2 of the second object 2. One side of the fourth surface 22 is connected to one side of the third surface 21 away from the outer surface S2 of the second object 2. The third bonding surface 23 is corresponding to the first bonding surface 13, and the third bonding surface 23 is located adjacent to the outer periphery of the second object 2 and connected to one side of the fourth surface 22 away from the third surface 21. The fourth bonding surface 24 is corresponding to the welding portion 14 and the second bonding surface 15, and one side of the fourth bonding surface 24 is connected to one side of the third bonding surface 23. A width W2 of the fourth bonding surface 24 is substantially equal to a sum of a bottom length L1 of the welding portion 14 and the width W1 of the second bonding surface 15. To be noted, in this embodiment, the third surface 21 and the fourth surface 22 are perpendicular to each other, and the third bonding surface 23 and the fourth surface 22 are perpendicular to each other. In other embodiments, any two surfaces can be connected with an included angle of, for example but not limited to, 30, 45 or 60 degrees as long as the surfaces of the second object 2 are corresponding to the first surface 11, the second surface 12 and the first bonding surface 13, and this disclosure is not limited. In addition, as shown in FIG. 2B, the welding portion 14 is shown by dotted lines for merely showing the corresponding positions of components of the welding structures 100 clearly. It should be noted that the welding portion 14 cannot be inserted into the fourth welding surface 24 as shown in FIG. 2B before or after the ultrasonic welding process, and FIG. 2B is only an illustration. The structure before the ultrasonic welding process can be referred to FIG. 2A, and the structure after the ultrasonic welding process can be referred to FIG. 2C.

As shown in FIGS. 2B and 2C, in this embodiment, during the ultrasonic welding process, the welding portion 14 is melted to form a gel (referring to the gray part between the first object 1 and the second object 2 of FIG. 2C), for bonding the second bonding surface 15 and the fourth bonding surface 24.

With reference to FIGS. 2A to 2C again, in this embodiment, the second object 2 further comprises a detention groove 25, which is disposed on the fourth surface 22. For example, the detention groove 25 can be a U-shape groove or a V-shape groove. The design of the detention groove 25 can provide a space for accommodating the gel formed by melting the welding portion 14, thereby preventing the gel from overflowing from the gap between the first object 1 and the second object 2. Specifically, as shown in FIG. 2C, when performing the ultrasonic welding process, the welding portion 14 is melted into a gel (the gray part between the first object 1 and the second object 2 as shown in FIG. 2C) for bonding the second bonding surface 15 and the fourth bonding surface 24. The redundant gel will flow and fill into the detention groove 25 and will not overflow from the gap between the first object 1 and the second object 2.

In this embodiment, the first bonding surface 13 has a first anti-overflow structure A1, and the third bonding surface 23 has a second anti-overflow structure A2. Specifically, the first anti-overflow structure A1 and the second anti-overflow structure A2 both have non-planar microstructures. For example, each of the first anti-overflow structure A1 and the second anti-overflow structure A2 has a saw-tooth arrangement. In another example, each of the first anti-overflow structure A1 and the second anti-overflow structure A2 is a rough surface. In another example, the first anti-overflow structure A1 is a rough surface, and the second anti-overflow structure A2 has a saw-tooth structure. In another example, the first anti-overflow structure A1 has a saw-tooth structure, and the second anti-overflow structure A2 is a rough surface. The structures of the first anti-overflow structure A1 and the second anti-overflow structure A2 of this disclosure are not limited as long as they are both a non-planar microstructure. In this embodiment, the first anti-overflow structure A1 and the second anti-overflow structure A2 are configured to accommodate the gel formed by melting the welding portion 14, thereby preventing the gel from overflowing from the gap between the first object 1 and the second object 2, and enhancing the bonding stability of the first object 1 and the second object 2. In detailed, as shown in FIG. 2C, when performing the ultrasonic welding process, the welding portion 14 is melted into a gel (the gray part between the first object 1 and the second object 2 as shown in FIG. 2C) for bonding the second bonding surface 15 and the fourth bonding surface 24. The redundant gel will flow and fill into the first anti-overflow structure A1 and the second anti-overflow structure A2, and will not overflow from the gap between the first object 1 and the second object 2. Furthermore, the design of the first anti-overflow structure A1 and the second anti-overflow structure A2 can increase the contact area between the gel and the first object 1 and the second object 2, thereby increasing the connection strength after the ultrasonic welding process so as to make the connection between the first object 1 and the second object 2 more firmly.

As mentioned above, the first embodiment of this disclosure provides a welding structure 100 for connection of two objects, which comprises a first object 1 and a second object 2. The second object 2 is disposed corresponding to the first object 1. A gap G is formed between the first object 1 and the second object 2, and the gap G comprises at least one turn T. As shown in FIG. 2B, the gap G is defined between the first surface 11, the second surface 12, the first bonding surface 13, the welding portion 14 and the second bonding surface 15 of the first object 1 and the third surface 21, the fourth surface 22, the third bonding surface 23 and the fourth bonding surface 24 of the second object 2. In addition, as shown in FIG. 2B, a part of the gap G defined between the second surface 12 and the first bonding surface 13 of the first object 1 and the fourth surface 22 and the third bonding surface 23 of the second object 2 is a turn T. The first object 1 or the second object 2 is configured with at least one welding portion 14, which further contacts with the other object and is located within the gap G. When the welding process is performed to connect the first object 1 and the second object 2, the at least one welding portion 14 is melted, and the melted welding portion 14 can flow and fill into the gap G as well as the at least one turn T. Specifically, after the ultrasonic welding process, the redundant part of the melted welding portion 14, after being filled in the gap G, can be accommodated in the turn T. Thus, the redundant welding portion 14 will not overflow from the gap between the first object 1 and the second object 2. To be noted, although in this example, one welding portion 14 is configured on the first object 1, the amount and position of the welding portions 14 can be adjusted based on user's requirement. This disclosure is not limited thereto.

In addition, the first bonding surface 13 around the turn T can be configured with the first anti-overflow structure A1, and the third bonding surface 23 around the turn T can be configured with the second anti-overflow structure A2. Moreover, the fourth surface 22 can be configured with the detention groove 25. The structures and functions of the first anti-overflow structure A1, the second anti-overflow structure A2, and the detention groove 25 can be referred to the above examples, so the detailed descriptions thereof will be omitted here.

Figure 3A:
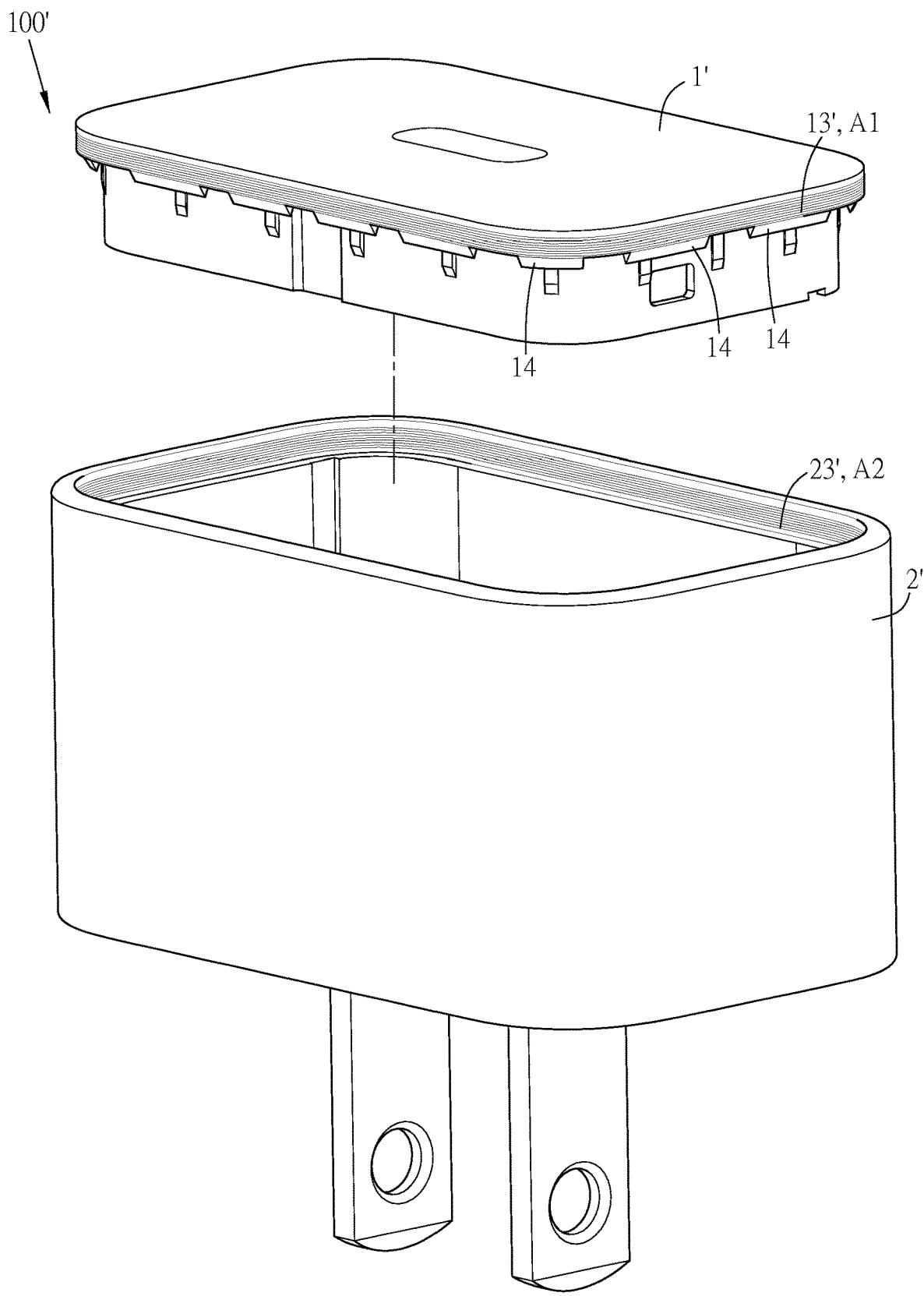
FIG. 3A is an exploded view of the first object and the second object of FIG. 1A according to the second embodiment.

Please refer to FIG. 1A in view of FIG. 3A, wherein FIG. 3A is an exploded view of the first object and the second object of FIG. 1A according to the second embodiment. In this embodiment, a welding structure 100' for connection of two objects comprises a first object 1' and a second object 2'. In this embodiment, the two objects are assembled to form an electronic connector for example. To be noted, the two objects can be assembled to form, for example but not limited to, a computer host, a display, an electronic connector, a power supply, or any of other electronic devices. In addition, the two objects can also be the parts of a cabinet, a box or the like (not limited to an electronic device) that can be subjected to the ultrasonic welding process. The object can be, for example but not limited to, the housing, cover or any of the structures to be fixed correspondingly of the above-mentioned devices or products.

Figure 3B:
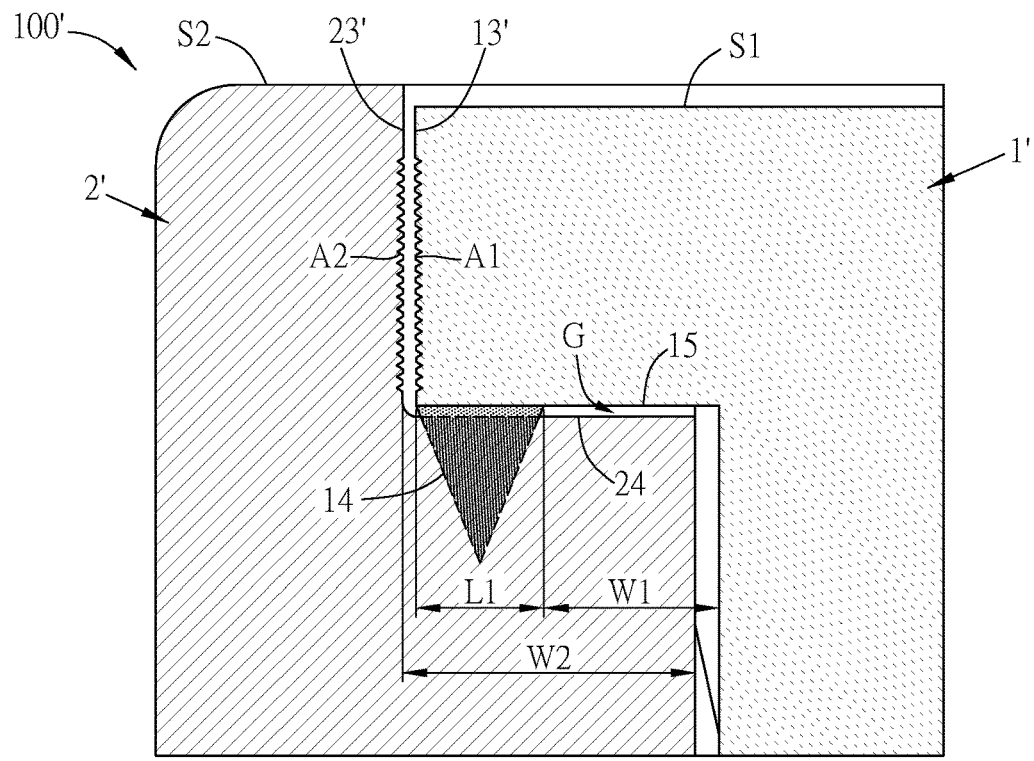
Figure 3C:
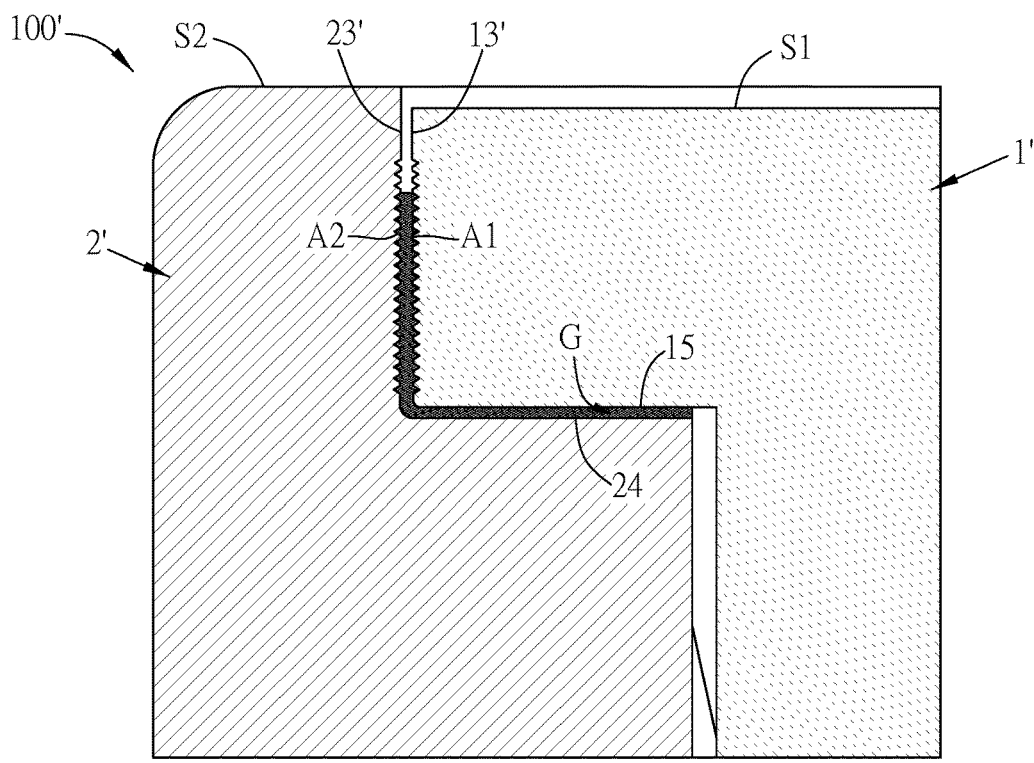
Figure 4A:
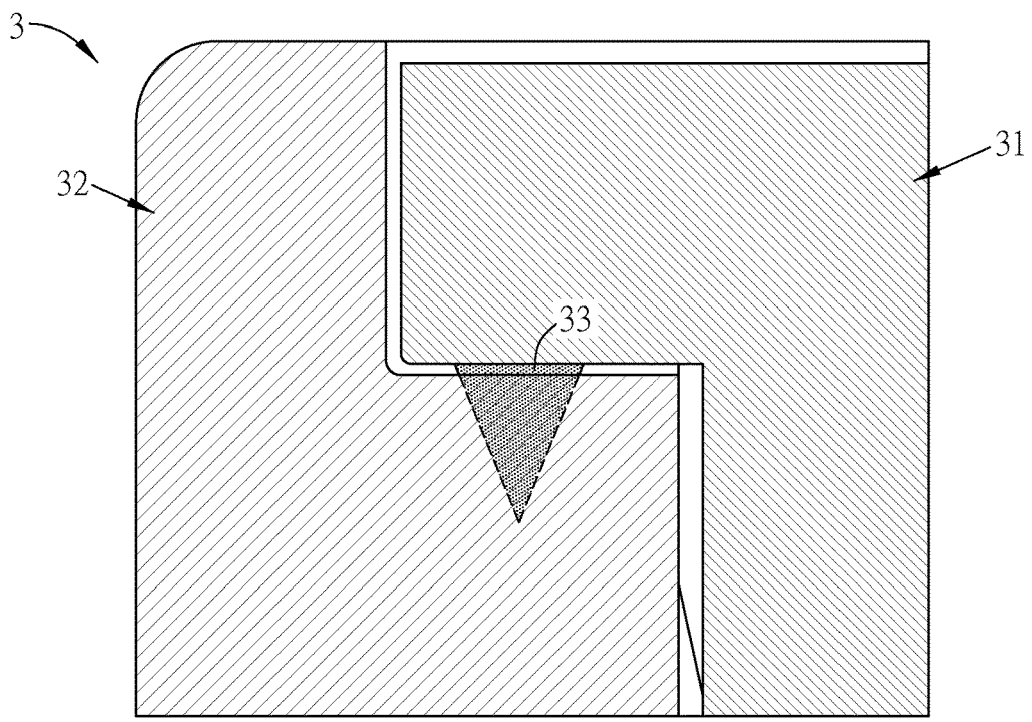
FIG. 4A is a partial enlarged sectional view of the conventional first and second objects before performing the welding process.
Figure 4B:
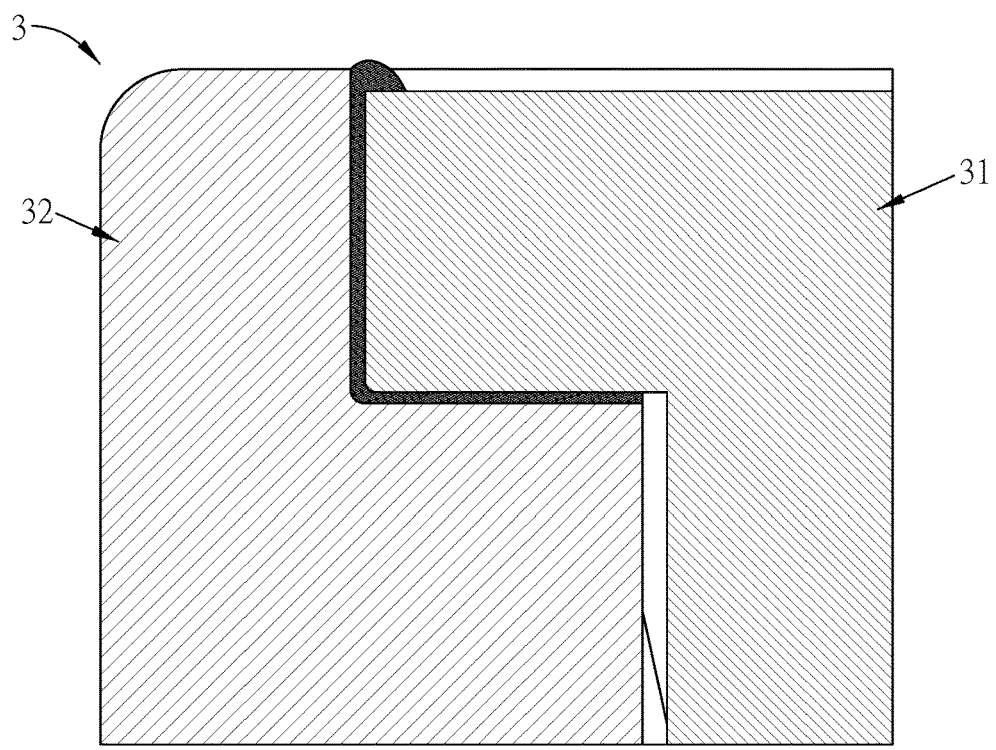
FIG. 4B is a partial enlarged sectional view of the conventional first and second objects of FIG. 4A after performing the welding process.

Please refer to FIG. 1A and FIGS. 3A to 3C. FIG. 3B is a partial enlarged sectional view of the first and second objects of FIG. 3A, wherein FIG. 3B shows the assembled first and second objects as well as the welding structure before performing the welding process. FIG. 3C is a partial enlarged sectional view of the first and second objects of FIG. 3B, wherein FIG. 3C shows the assembled first and second objects as well as the welding structure after performing the welding process. In this embodiment, the first object 1' comprises a first bonding surface 13', a welding portion 14, and a second bonding surface 15. The first bonding surface 13' is located at the outer periphery of the first object 1' and perpendicular to an outer surface S1 of the first object 1', and the first bonding surface 13' comprises a first anti-overflow structure A1. The welding portion 14 is disposed on a surface of the first object 1' perpendicular and connected to the first bonding surface 13'. The welding portion 14 has a shape of triangular prism. One side of the second bonding surface 15 is connected to the welding portion 14, and the second bonding surface 15 has a width W1. To be noted, the welding structure 100' can be disposed at a part of the junction of the first object 1' and the second object 2' instead of the entire junction thereof. For example, as shown in FIG. 3A, the welding portion 14 of the first object 1' of the welding structure 100' can comprise a plurality of sections, which are separately disposed on the surface perpendicular and connected to the first bonding surface 13'. Alternatively, the welding portion 14 can be a single structure (not shown) continuously disposed on the entire surface perpendicular and connected to the first bonding surface 13'. Any structure that can firmly fix the first object 1' to the second object 2' after the ultrasonic welding process is applicable, and this disclosure is not limited thereto.

In this embodiment, the second object 2' is correspondingly connected to the first object 1'. The second object 2' comprises a third bonding surface 23' and a fourth bonding surface 24. The third bonding surface 23' is located at the outer periphery of the second object 2' and perpendicular to an outer surface S2 of the second object 2'. The third bonding surface 23' is corresponding to the first bonding surface 13', and the third bonding surface 23' has a second anti-overflow structure A2. The fourth bonding surface 24 is corresponding to the welding portion 14 and the second bonding surface 15, and one side of the fourth bonding surface 24 is connected to one side of the third bonding surface 23'. A width W2 of the fourth bonding surface 24 is substantially equal to a sum of a bottom length L1 of the welding portion 14 and the width W1 of the second bonding surface 15. To be noted, as shown in FIG. 3B, the welding portion 14 is shown by dotted lines for merely showing the corresponding positions of components of the welding structures 100' clearly. It should be noted that the welding portion 14 cannot be inserted into the fourth welding surface 24 as shown in FIG. 3B before or after the ultrasonic welding process, and FIG. 3B is only an illustration. The structure before the ultrasonic welding process can be referred to FIG. 3A, and the structure after the ultrasonic welding process can be referred to FIG. 3C.

As shown in FIGS. 3B and 3C, in this embodiment, during the ultrasonic welding process, the welding portion 14 is melted to form a gel (referring to the gray part between the first object 1' and the second object 2' of FIG. 3C), for bonding the second bonding surface 15 and the fourth bonding surface 24.

In this embodiment, the first anti-overflow structure A1 and the second anti-overflow structure A2 both have non-planar microstructures. For example, each of the first anti-overflow structure A1 and the second anti-overflow structure A2 has a saw-tooth arrangement. In another example, each of the first anti-overflow structure A1 and the second anti-overflow structure A2 is a rough surface. In another example, the first anti-overflow structure A1 is a rough surface, and the second anti-overflow structure A2 has a saw-tooth structure. In another example, the first anti-overflow structure A1 has a saw-tooth structure, and the second anti-overflow structure A2 is a rough surface. The structures of the first anti-overflow structure A1 and the second anti-overflow structure A2 of this disclosure are not limited as long as they are both a non-planar microstructure. In this embodiment, the first anti-overflow structure A1 and the second anti-overflow structure A2 are configured to accommodate the gel formed by melting the welding portion 14, thereby preventing the gel from overflowing from the gap between the first object 1' and the second object 2', and enhancing the bonding stability of the first object 1' and the second object 2'. In detailed, as shown in FIG. 3C, when performing the ultrasonic welding process, the welding portion 14 is melted into a gel (the gray part between the first object 1' and the second object 2' as shown in FIG. 3C) for bonding the second bonding surface 15 and the fourth bonding surface 24. The redundant gel will flow and fill into the first anti-overflow structure A1 and the second anti-overflow structure A2, and will not overflow from the gap between the first object 1' and the second object 2'. Furthermore, the design of the first anti-overflow structure A1 and the second anti-overflow structure A2 can increase the contact area between the gel and the first object 1' and the second object 2', thereby increasing the connection strength after the ultrasonic welding process so as to make the connection between the first object 1' and the second object 2' more firmly.

As mentioned above, the second embodiment of this disclosure provides a welding structure 100' for connection of two objects, which comprises a first object 1' and a second object 2'. The second object 2' is disposed corresponding to the first object 1'. A gap G is formed between the first object 1' and the second object 2', and at least a part of the side walls of the first object 1' and/or the second object 2' around the gap G is configured with a microstructure (e.g. the first anti-overflow structure A1 and the second anti-overflow structure A2 as shown in FIG. 3B). As shown in FIG. 3B, the gap G is defined between the first bonding surface 13', the welding portion 14 and the second bonding surface 15 of the first object 1' and the third bonding surface 23' and the fourth bonding surface 24 of the second object 2'. The first object 1' or the second object 2' is configured with at least one welding portion 14, which further contacts with the other object and is located within the gap G. When the welding process is performed to connect the first object 1' and the second object 2', the at least one welding portion 14 is melted, and the melted welding portion 14 can flow and fill into the gap G as well as the space of the microstructures. Specifically, after the ultrasonic welding process, the redundant part of the melted welding portion 14, after being filled in the gap G, can be accommodated in the microstructures (e.g. the first anti-overflow structure A1 and the second anti-overflow structure A2 as shown in FIG. 3B). Thus, the redundant welding portion 14 will not overflow from the gap between the first object 1' and the second object 2'. To be noted, although in this example, one welding portion 14 is configured on the first object 1', the amount and position of the welding portions 14 can be adjusted based on user's requirement. This disclosure is not limited thereto. In addition, although in this example, the first bonding surface 13' of the first object 1' and the third bonding surface 23' of the second object 2' are both configured with a microstructure, it is also possible to form the microstructure only on a part of the side wall of the first object 1' or a part of the side wall of the second object 2'. This disclosure is not limited thereto.

In summary, the welding structure of this disclosure has the design of the anti-overflow structure(s) and/or the detention groove, or the configuration of at least one turn at the gap between two objects for preventing the gel overflow issue. Accordingly, the welding structure of this disclosure can save the cost for the manpower and time on checking and removing the overflowed gel, improving the production efficiency, and keeping the clean appearance of the product. In addition, the configuration of the anti-overflow structure can increase the contact area between the gel and two objects, thereby enhance the connection strength after the ultrasonic welding process so as to make the connection between two objects more firmly.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A welding structure for connection, comprising:
  a first object comprising:
    a first top surface;
    a first surface located at an outer periphery of the first object, perpendicular to the first top surface, and connected to one side of the first top surface;
    a second surface connected to one side of the first surface away from the first top surface, wherein a projection of the second surface on a first plane parallel to the first top surface is within a projection of the first top surface on the first plane;
    a first bonding surface located adjacent to the outer periphery of the first object, connected to one side of the second surface away from the first surface, and having a first anti-overflow structure, wherein the first anti-overflow structure is non-planar microstructures or in a saw-tooth arrangement;
    a welding portion disposed on a surface of the first object perpendicular and connected to the first bonding surface, wherein the welding portion has a shape of a triangular prism, and a projection of the welding portion on the first plane is within the projection of the first top surface on the first plane; and
    a second bonding surface is connected to the welding portion, wherein a projection of the second bonding surface on the first plane is within the projection of the first top surface on the first plane; and
  a second object correspondingly connected to the first object and comprising:
    a second top surface;
    a third surface corresponding to the first surface, located at an outer periphery of the second object, perpendicular to the second top surface, and connected to one side of the second top surface;
    a fourth surface connected to one side of the third surface away from the second top surface, wherein a projection of the fourth surface on a second plane parallel to the second top surface is not within a projection of the second top surface on the second plane;
    a third bonding surface corresponding to the first bonding surface, located adjacent to the outer periphery of the second object, connected to one side of the fourth surface away from the third surface, and having a second anti-overflow structure, wherein the second anti-overflow structure is non-planar microstructures or in a saw-tooth arrangement, and after the second object is connected to the first object by an ultrasonic welding process, the second anti-overflow structure directly faces the first anti-overflow structure; and
    a fourth bonding surface corresponding to the welding portion and the second bonding surface, and connected to one side of the third bonding surface, wherein a projection of the fourth bonding surface on the second plane is not within the projection of the second top surface on the second plane, and a width of the fourth bonding surface is equal to a sum of a bottom length of the welding portion and a width of the second bonding surface.

2. The welding structure of claim 1, wherein the second object further comprises a detention groove disposed on the fourth surface.

3. The welding structure of claim 2, wherein the detention groove is a U-shape groove or a V-shape groove.

4. The welding structure of claim 1, wherein when performing the ultrasonic welding process, the welding portion is melted to form a gel for bonding the second bonding surface to the fourth bonding surface.

5. A welding structure for connection, comprising:
a first object comprising:
a first top surface;
a first bonding surface located at an outer periphery of the first object, perpendicular to the first top surface, connected to one side of the first top surface, and having a first anti-overflow structure, wherein the first anti-overflow structure is non-planar microstructures or in a saw-tooth arrangement;
a welding portion disposed on a surface of the first object perpendicular and connected to the first bonding surface, wherein the welding portion has a shape of a triangular prism, and a projection of the welding portion on a first plane parallel to the first top surface is within a projection of the first top surface on the first plane; and
a second bonding surface is connected to the welding portion, wherein a projection of the second bonding surface on the first plane is within the projection of the first top surface on the first plane; and
a second object correspondingly connected to the first object and comprising:
a second top surface;
a third bonding surface located at an outer periphery of the second object, perpendicular to the second top surface, connected to one side of the second top surface, corresponding to the first bonding surface, and having a second anti-overflow structure, wherein the second anti-overflow structure is non-planar microstructures or in a saw-tooth arrangement, and after the second object is connected to the first object by an ultrasonic welding process, the second anti-overflow structure directly faces the first anti-overflow structure; and
a fourth bonding surface corresponding to the welding portion and the second bonding surface, and connected to one side of the third bonding surface, wherein a projection of the fourth bonding surface on a second plane parallel to the second top surface is not within a projection of the second top surface on the second plane, and a width of the fourth bonding surface is equal to a sum of a bottom length of the welding portion and a width of the second bonding surface.

6. The welding structure of claim 5, wherein when performing the ultrasonic welding process, the welding portion is melted to form a gel for bonding the second bonding surface to the fourth bonding surface.

\* \* \* \* \*